June 16, 1936.  E. W. HOLIDAY ET AL  2,044,353
HARDFACED UNDERREAMER CUTTER AND METHOD OF FORMING THE SAME
Filed Dec. 26, 1934
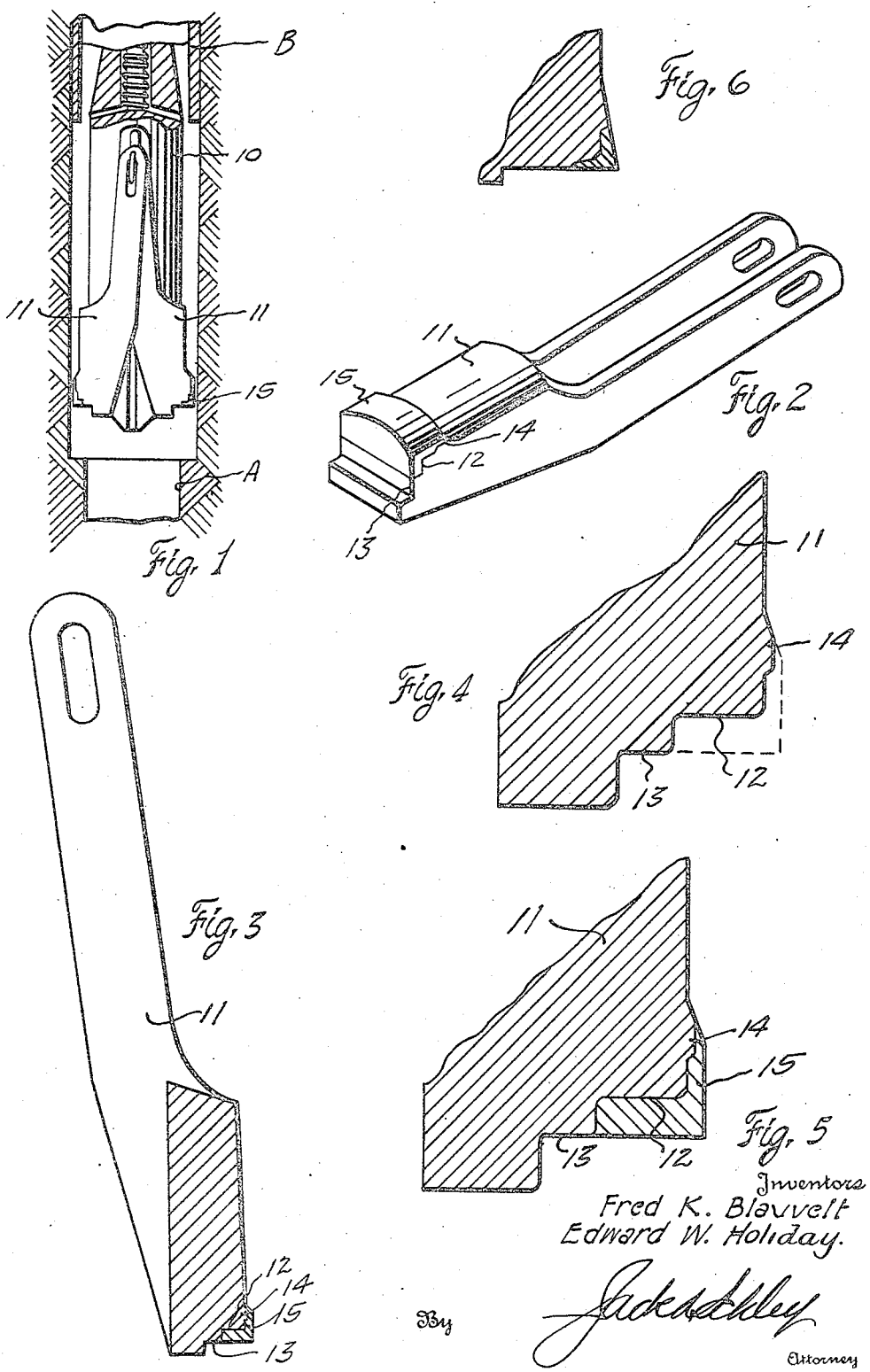

Patented June 16, 1936

2,044,353

UNITED STATES PATENT OFFICE 2,044,353

HARDFACED UNDERREAMER CUTTER AND METHOD OF FORMING THE SAME

Edward W. Holiday and Fred K. Blauvelt, Wichita, Kans., assignors to The Bridgeport Machine Company, Wichita, Kans., a corporation of Delaware Application December 26, 1934, Serial No. 759,222

2 Claims. (Cl. 76—108)

This invention relates to new and useful improvements in methods of hardfacing cutters and to the product thereof.

It has been the practice in the manufacture of cutting tools to provide said tool with a cutting edge of hard material, such as carbides of various metals. In applying this hard material to the tool, only a comparatively thin layer of the hard material has been secured to the tool. Further the layer has either been applied on an inclined surface because the edge of the tool is beveled or the hard surfacing has not been adequately braced against shearing strains. Due to the thinness of the layer and the inclined backing, there is a tendency for the hard material to spall or break off under cutting strains, thereby reducing the efficiency, as well as causing frequent resurfacing.

One object of the invention is to provide an improved method of applying a hardfacing material to a cutting tool to form a cutting edge, said material being so applied as to eliminate its spalling or breaking off from the body of said tool.

A particular object of the invention is to provide an improved method of hardfacing a cutting tool which consists in forming recesses or cut-out portions in stepped relation along the lower outer edge of the cutting tool, and inserting a hard material in such recesses, which are of sufficient depth to receive a substantially thick layer of said hard material whereby the life of the cutting edge is prolonged and more efficient work is done.

Another object of the invention is to form stepped recesses in the lower outer edge of a cutting tool for receiving hard material to form a cutting edge, said recesses being angular in shape and extending at substantially right angles to the vertical and horizontal planes of the material to be cut, whereby the outer cutting edge of hard material is provided with a backing to absorb the shock of the cutting operation, thereby eliminating the necessity of field dressing the tool.

A further object of the invention is to provide a cutting edge of hard metal on a cutting tool, said hard metal being of a thickness equal to the thickness of the material removed in cutting, whereby tendency of said metal to spall or break off is eliminated. A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a vertical, sectional view of a portion of an underreamer constructed in accordance with the invention, Figure 2 is an isometric view of one of the cutters, Figure 3 is a longitudinal sectional view of the same, Figure 4 is an enlarged sectional view of the lower end of the cutter without the hardfacing applied thereto, Figure 5 is a view similar to Figure 4 and having the hardfacing applied thereto, and Figure 6 is a sectional view of a modified form of the invention.

In the drawing, the numeral 10 designates the body of an ordinary underreamer for use in wells. The body carries a pair of retractible cutters 11 which depend therefrom and these cutters perform the actual reaming operation. The drill (not shown) first drills the hole A, as shown, and the underreamer is then utilized to enlarge said hole to permit the casing B to move downwardly therein or for other purposes. The lower outer edge of each cutter, as well as the bottom thereof, engages the side wall of the hole and removes material from one to two inches in thickness to enlarge said hole. This outer edge and bottom is usually provided with a facing of hard material, such as carbides of various metal, whereby the life of said cutting edge is prolonged and will perform more efficiently. In applying this hard material to the cutter, the usual practice has been to bevel the cutting edge, as shown in Figure 6, and apply said material thereto. Due to the particular way this edge has been cut back, only a thin layer of the hard material can be applied and also since the material is secured to an inclined surface, there is a tendency for said material to spall or break off particularly at its edges under shearing strain because of the lack of any shoulder or other means to absorb the shock, or jar.

In carrying out the improved method, the bottom of the body 11 of the cutter is stepped to form shoulders 12 and 13. The shoulder 12 which is at the outer marginal portion of the cutter is of a greater width than the inner shoulder 13 and both shoulders are flat in a horizontal plane. An outwardly extending flange 14 is formed on the outer side of the body above the shoulder 12 and this flange has both its upper and lower end beveled, the upper bevel being at a greater inclination (Figures 4 and 5). The hard material 15 which forms the cutting edge is applied to the body as shown, said material fitting against the flat shoulder 12 and having its lower edge in the same horizontal plane with the inner shoulder 13. Along the side of the body the material extends upwardly around the flange 14 and has its upper end beveled merging into the upper bevel of the flange. The flange 14 extends outwardly a sufficient distance to permit a comparatively thick coating of the hard material to be placed on the outer side of the body. Also, the depth of the step between the shoulders 12 and 13 is such that a thick layer of the hard material may be applied on the bottom of the cutter. Thus, it is obvious that after the material is applied in this manner, a substantially thick and enlarged cutting edge of hard material is provided.

It is pointed that with this construction the outer edge and bottom of the cutter which engages the material to be removed from the hole is of hard material, which permits the hole to be kept more nearly reamed out to gauge. Further, the thickness of the hard material is equal to the thickness of the material to be removed in cutting, whereby spalling or breaking off of the cutting edge under shearing strains is prevented, thereby eliminating field dressing of the cutters as well as providing a cutter which will underream several times the number of feet of hole as the ordinary cutter will.

An important feature of the construction is the insertion of the hard material in the offset formed between the shoulders 12 and 13, and also the application of said material to the outer face of the cutter beneath the flange 14. It is obvious that this structure provides a positive backing for the hard material, whereby the jar and shock of the cutting operation is absorbed and the hardfacing protected against the sudden impact of the cutter with the formation being cut.

This greatly prolongs the life of the cutter because the body 11 of said cutter, rather than the cutting edge, takes the shock. The right angular disposition of the recess below the shoulder 12 wherein the hard material is inserted forms a pocket for the material, thereby preventing it from being jarred or broken therefrom. The size of the shoulders and flange are subject to variation without detracting from the efficiency of the cutting edge and welding or any other suitable method may be employed in applying the hard material to said cutter. It is pointed out that the thickness of the hard material which is substantially equal to the thickness of the material to be removed in cutting is one of the features of the invention.

What we claim and desire to secure by Letters Patent is:

1. The method of hard surfacing a cutting edge of an underreamer consisting in forming the bottom of the underreaming tool with amplified flat surfaces forming a series of shoulders starting at the side and terminating at the lower cutting edge of the tool, and welding relatively thick surfacing of hard metal to said amplified surfaces, whereby said hard metal is braced against horizontal and vertical shearing strains.

2. An underreaming tool including, a body having its bottom and lower outer side portion formed with a series of shoulders starting at the side and terminating at the lower edge of the body, and a relatively thick surfacing of hard metal providing the cutting edges for making substantially vertical and horizontal cuts welded into the recesses of the body as provided for by said shoulders and extending throughout the cutting region of the member, whereby horizontal and vertical shearing of the cutting element is minimized and the life of the tool is prolonged.

EDWARD W. HOLIDAY.
FRED K. BLAUVELT.